W. W. SPAFFORD.
Car Wheel.
No. 27,163.
Patented Feb. 14, 1860.
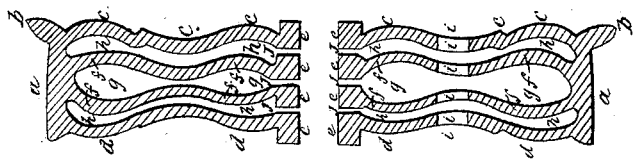
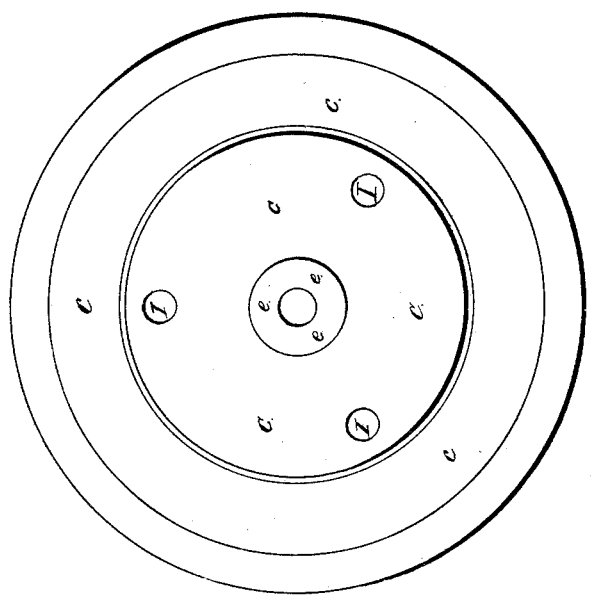
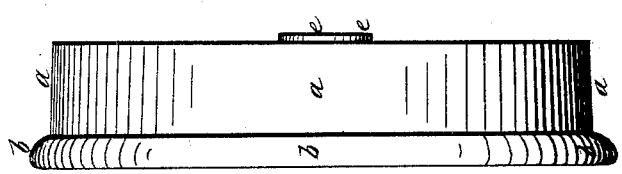
Witnesses:
John R. Miller
R. B. Richardson
Inventor:
Wm. W. Spafford

UNITED STATES PATENT OFFICE.

WILLIAM W. SPAFFORD, OF PETERBORO, NEW HAMPSHIRE.

RAILROAD-CAR WHEEL.

Specification of Letters Patent No. 27,163, dated February 14, 1860.

*To all whom it may concern:*

Be it known that I, WILLIAM W. SPAFFORD, of Peterboro, in the county of Hillsboro and State of New Hampshire, have invented and made certain new and useful Improvements in the Construction of Railroad-Car Wheels; and I do hereby declare that the following is a full, clear, and exact description of the same, reference being had to the accompanying drawings, making a part of this specification, in which—

Figure 1 is a side view of a wheel. Fig. 2, is a transverse section or cut through the center of a wheel. Fig. 3 is an edge view of a wheel.

The nature of my improvement consists in constructing car wheels with one or more internal, curved, or corrugated, continuous circular diaphragms; forming continuous cells, chambers, or cavities throughout the interior of the wheel, said internal diaphragms or partitions connecting at and around the interior of the wheel, and through which peculiar formation, undue contraction and expansion of the cast metal wheel, and liability to crack or break, are thereby prevented, while also affording at the same time, a light, yet strong, and durable cast metal car wheel. And the peculiar shape of the outward metal shells and internal diaphragms or partitions admit of the incumbent downward weight or pressure acting vertically: the weight also being more distributed throughout the material of the wheel, and eased upon the axle, than if the wheel was solid or the diaphragms or partitions in form of straight disks, or arranged obliquely as in some metal wheels.

In Fig. 2, *a*, *a*, indicate the rim or face of the wheel.

*b*, *b*, *b*, Figs. 2 and 3, indicate the flange or guard of the wheel.

*c*, *c*, *c*, *c*, *c*, *c* indicate the inner or right hand side shell, disk, or surface metal.

*d*, *d*, *d*, *d*, indicate the out or offside disk or shell, surface metal.

*e*, *e*, *e*, *e* indicate the hub or center of the wheel in which the axle end is secured.

*f*, *f*, *f*, *f*, indicate the internal, curved, or corrugated, continuous, circular diaphragms or partitions.

*g*, *g*, *g*, *g* indicate the central cell, cavity or chamber.

*h*, *h*, *h*, *h*, indicate the surrounding or outer cavities, cells, or chambers.

*i*, *i*, *i*, *i*, *i* Figs. 1 and 2 indicate the core openings.

By a reference to the sectional diagram Fig. 2, it will be perceived, that in casting the wheel, it will be required to have three cores, of the form shown at the spaces *g*—*h* Fig. 2. After the wheel is cast, the cores, can be broken up and detached, and brought out through the holes or openings *i*, *i*, *i*, as indicated in Fig. 1.

By a reference to Fig. 2, it will be perceived that the hub or center of the wheel is not solid, but divided into four sections as indicated at the letters *e*, *e*, *e*, *e*, core spaces being formed as at *j*, *j*, *j*, so that the diaphragms *f*, *f*, *f*, *f*, are separated entirely from the sides *c*—*d*, of the wheel, and only connected at the rim or tread *a*, *a*, of the wheel.

Owing to the peculiar curved shapes of the shells *c*—*d*, and their being separated or disconnected from the diaphragms or partitions *f*, *f*, *f*, *f*, should a fracture occur in one, it could not extend to, or affect the other, nor could any fracture or break, of the outside part affect the strength of the parts *f*, *f*, *f*, *f*.

Having described and represented my improvements, what I claim as new and desire to have secured by Letters Patent of the United States is as follows, viz:

I claim the construction of a car wheel formed with curved or corrugated shell side surfaces *c*, *c*—*d*, *d*, and internal diaphragms or partitions *f*, *f*, *f*, *f*, forming one or more internal cells, cavities, chambers, or spaces *g*, *g*—*h*, *h*, when said surfaces and diaphragms are so arranged that the incumbent downward weight, or pressure acting thereon, shall be in a direction vertically throughout said parts of the wheel, substantially as set forth and described.

WILLIAM W. SPAFFORD. [L. S.]

Witnesses:
 T. K. AMES, 2d,
 A. S. SCOTT.